H. A. WILLIAMS.
COMBINATION GO-CART AND SULKY.
APPLICATION FILED AUG. 16, 1913.

1,104,335.

Patented July 21, 1914.

2 SHEETS—SHEET 1.

Witnesses

Inventor
Henry A. Williams
By E. B. Stocking
Attorney

H. A. WILLIAMS.
COMBINATION GO-CART AND SULKY.
APPLICATION FILED AUG. 16, 1913.
1,104,335.
Patented July 21, 1914.
2 SHEETS—SHEET 2.
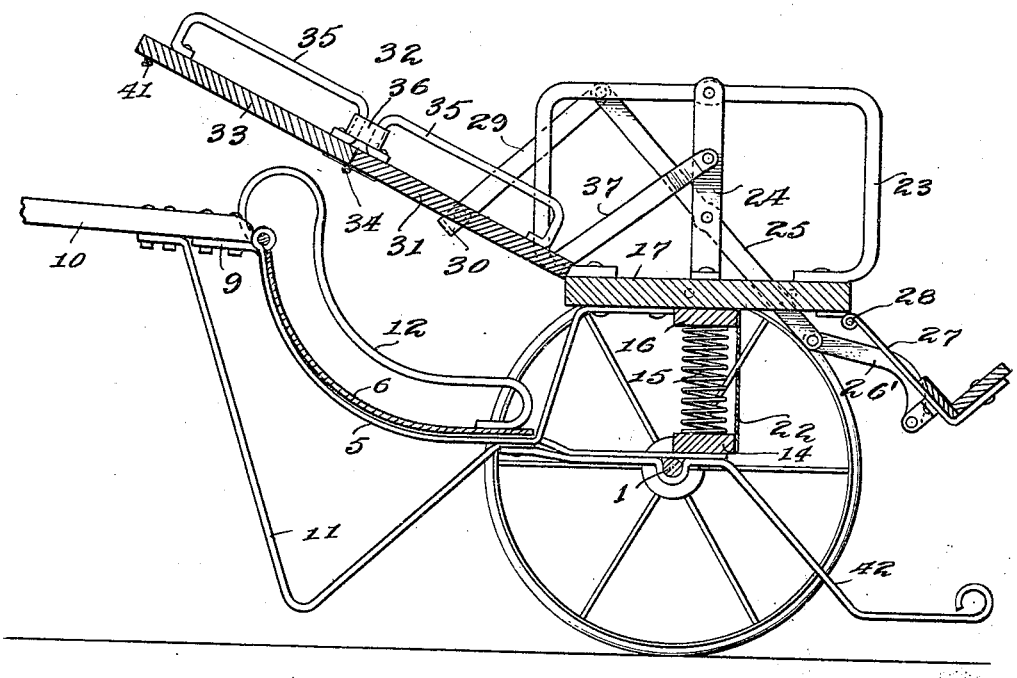
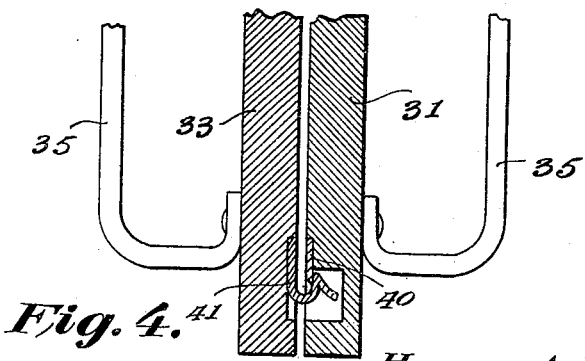
Witnesses
Inventor
Henry A. Williams
By E. B. Stocking
Attorney

UNITED STATES PATENT OFFICE.

HENRY A. WILLIAMS, OF MURPHYSBORO, ILLINOIS.

COMBINATION GO-CART AND SULKY.

1,104,335.   Specification of Letters Patent.   Patented July 21, 1914.

Application filed August 16, 1913.   Serial No. 785,049.

*To all whom it may concern:*

Be it known that I, HENRY A. WILLIAMS, a citizen of the United States, residing at Murphysboro, in the county of Jackson and State of Illinois, have invented certain new and useful Improvements in Combination Go-Carts and Sulkies, of which the following is a specification, reference being had therein to the accompanying drawing.

This invention relates to certain new and useful improvements in a combination go-cart and sulky; the object being to provide a child's carriage which can be readily converted into either a sulky or a go-cart.

Another object of the invention is to provide a carriage which is mounted upon a wheeled axle in such a manner that the same can be either pushed or pulled; the sectional back thereof being capable of being adjusted to either end of the seat or to an inclined position so as to allow the child to assume a reclining position.

Another and further object of the invention is to provide a carriage in which the seat is mounted upon springs so as to allow the same to ride easily; novel means being provided for mounting the seat so that the same will be securely held in its proper position without any danger of it swinging.

Another and still further object of the invention is to provide means for holding the adjustable back in its adjusted position.

Other and further objects and advantages of the invention will be hereinafter set forth and the novel features thereof defined by the appended claims.

Figure 1:
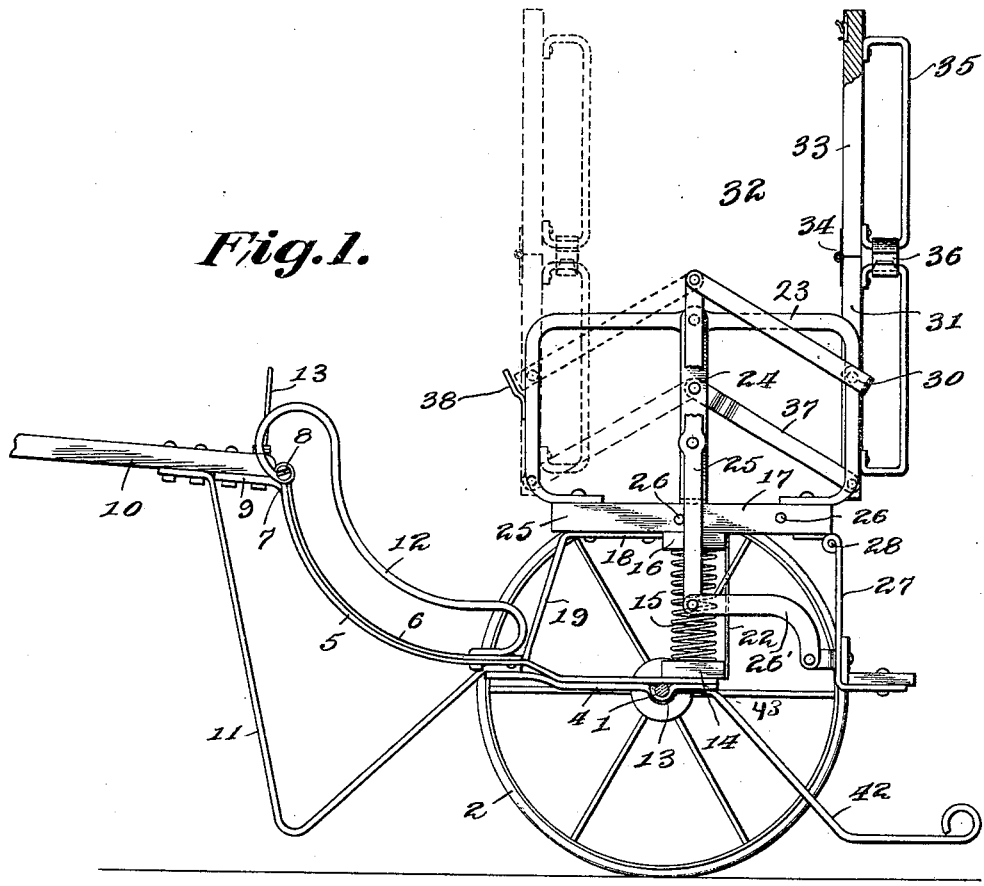
Figure 2:
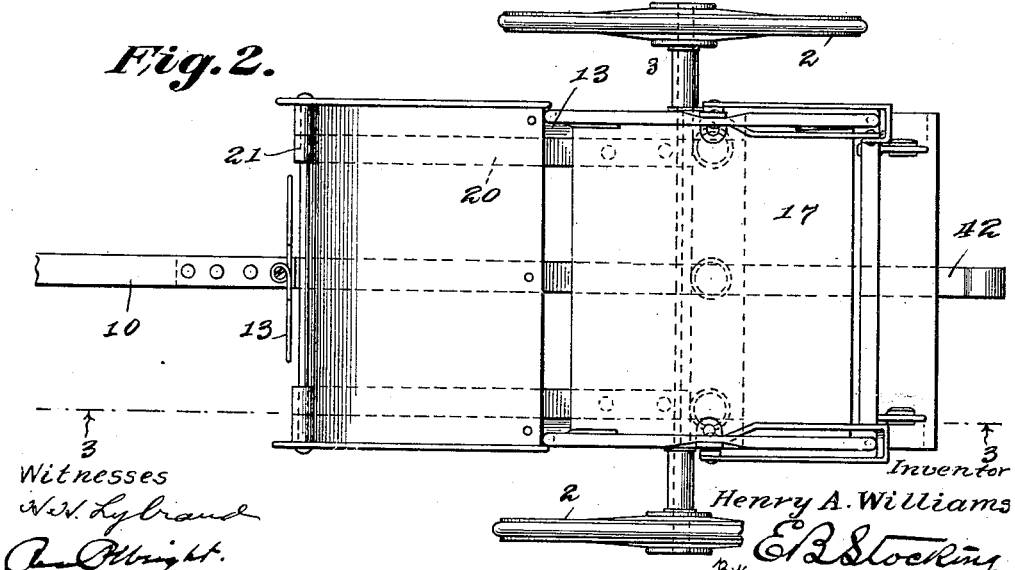

In the drawings Figure 1, is a side elevation of my improved construction of go-cart or sulky; Fig. 2, is a top plan of the same; Fig. 3, is a longitudinal vertical section showing the back moved into an inclined position; and Fig. 4, is a detail enlarged section of the sectional back showing the manner of holding the same in folded position.

Like numerals of reference refer to like parts in the several figures of the drawings.

In carrying out my improved invention, I employ a wheeled axle 1 provided with the usual wheels 2 preferably formed with rubber tires as clearly shown; said wheels being held in their proper positions upon the axle by sleeves or enlarged portions 3 as clearly shown in Fig. 2. Fixed to the top of the axle are spaced straps 4 by any suitable means which are provided with curved ends 5 carrying a foot rest 6 which terminates in a dash portion; the two outer straps having eyes 7 formed at their ends through which extends a bolt 8 connecting the two straps. The center strap is provided with an extended portion 9 on which is mounted a tongue 10 having a tongue support 11 connected thereto as clearly shown in Fig. 1; said tongue support being preferably V-shaped, the other end of which is connected to the central strap as shown, so that the foot rest carried thereby will be supported above the surface of the ground for the purpose later described.

The foot rest 6 is provided with side frames 12 as clearly shown in Figs. 1 and 3, and the foot rest is preferably secured in position upon the straps 5 in order to securely hold the same in proper position, by riveting the same thereto. The tongue also carries a rein guide 13 so that when the carriage is used as a sulky as will be hereinafter described, a pair of toy reins can be placed within the same and used in the ordinary manner. The opposite ends of the straps 5 extend out beyond the axle 1 and mounted thereon, is a bolster 14 having spaced coil springs 15 arranged thereon upon which is mounted an upper bolster 16 fixed to the under side of a seat 17 in order to support the seat upon spring cushions.

Secured to the under side of the seat are straps 18 which are provided with depending portions 19 terminating in curved portions 20 conforming in shape to the foot rest 6 having eyes 21 formed at their ends which are mounted upon the bolt 8 so as to swing thereon when the seat frame is depressed by placing a weight thereon, as clearly shown in Fig. 3. These straps hold the seat in its proper position in respect to the lower bolster in order to prevent the springs from becoming twisted and in order to prevent the springs from becoming stretched or from expanding, I connect the two bolsters by a strap 22.

The seat 17 is provided with side frames 23 having central uprights 24 in the sides of which are pivotally mounted levers 25, the movements of which are limited by stops 26 arranged upon the side of the seat as clearly shown in Fig. 1; said levers being pivotally connected at their lower ends to curved links 26' which are in turn, pivotally connected to a pivoted foot rest 27. The foot rest 27 comprises a pair of spaced bars having eyes at their upper ends which are mounted upon pivot pins 28 fixed to the under side of the seat; said bars being provided with slats forming the foot rest proper. The upper ends of the levers 25 carry links 29 provided with angled end portions 30 which are pivotally connected to the lower section 31 of a back 32; said back being formed of the lower section 31 and the upper section 32 pivotally connected together as shown at 34, each section being provided with side rails 35; the upper rails carrying pivoted catches 36 for engaging the lower rails in order to hold the two sections in alinement as shown in Fig. 1. The lower section 31 of the back, is also connected to the central upright 24 of the side frames of the seat by links 37 which allows the back to be swung into either of the positions shown in Fig. 1, or into the reclining position as shown in Fig. 3.

The side frames 23 are provided with supports 38 at one end adapted to receive the offset portions 30 of the links 29 in order to hold the sectional back in the position as shown by dotted lines in Fig. 1; the back being held in the position shown by full lines in Fig. 1, without additional supports, as the sections of the back swing in the opposite direction and as the angled ends 30 engage the frames 23, the back will be securely held in that position. One section of the back carries a keeper 40 into which is adapted to extend, a spring catch 41 carried by the opposite section for locking the two sections of the back in folded position, as shown in Fig. 4.

Connected to the central strap 5 and extending around the axle 1 is a support 42 for preventing the seat from tilting in the opposite direction when the carriage is used as a go-cart and this support forms means for holding the central strap in position upon the axle. In order to provide means for holding the outer straps 5 in position upon the axle, I provide clips 43, but it is of course understood that any suitable means can be employed for holding the straps 5 in position upon the axle.

As shown in full lines in Fig. 1, the carriage is in position to be used as a sulky; the sectional back having been shifted so that when the baby sitting on the seat with its feet resting on the foot rest 6, the carriage can be pulled forwardly so as to form a sulky and the supports 11 and 42 prevent the carriage from tilting in either direction to such an extent that the occupant will not be liable to fall out. When the sectional back is shifted as shown in dotted lines in Fig. 1, the carriage is converted into a go-cart so that by grasping the tongue, the same can be pushed forwardly. As shown in Fig. 3, the back and foot rest with their connections, are shifted so as to assume an inclined position so as to support the occupant.

From the foregoing description, it will be seen that I have provided a convertible go-cart or sulky in which a spring-supported seat is employed having a fixed foot rest upon one end and a pivoted foot rest upon the other end in connection with a pivoted back which can be shifted from one end to the other of the seat in order to allow the occupant to face either direction and when facing one direction, the vehicle will have the appearance of a go-cart and when facing in the opposite direction, will have the appearance of a sulky.

I claim:

1. A child's carriage, comprising a wheeled axle, a spring-supported seat mounted upon said axle, a pivoted foot rest at one end of said seat, a fixed foot rest at the other end of said seat, and a pivotally mounted back arranged upon said seat and capable of being shifted to either end thereof, having a pivotal connection with said pivoted foot rest.

2. A convertible carriage of the kind described, comprising a wheeled axle, straps carried by said axle, a bolster mounted upon said straps, springs mounted upon said bolster, a bolster mounted upon said springs, a seat carried by said last-mentioned bolster, a foot rest carried by said straps, and straps carried by said seat extending under said foot rest.

3. A convertible carriage, comprising a wheeled axle, straps mounted upon said axle having eyes at their end, a bolt passing through said eyes, a spring-supported seat mounted upon said straps, spaced straps connected to said seat having eyes at their ends pivotally mounted upon said bolt, a foot rest carried by the first-mentioned straps, side frames mounted upon said seat, and a sectional back having a pivotal connection with said side frames.

4. A convertible carriage of the kind described, comprising a wheeled axle having a spring-supported seat mounted thereon, side frames carried by said seat, links pivotally connected to said side frames, pivoted levers, links carried by said levers, a back carried by said links, a pivoted foot rest at one end of said seat, and links connecting the lower ends of said levers to said pivoted foot rest.

5. A convertible carriage of the kind described, comprising a wheeled axle, a bolster mounted upon said axle, coil springs arranged upon said bolster, a bolster mounted upon said springs, a seat fixed to the last-mentioned bolster, side frames carried by said seat, pivotally mounted links carried by said side frames, and a sectional back connected to said pivoted links, said back being formed of pivotally mounted sections, and means for connecting said sections together in folded or set-up position.

6. A convertible carriage of the kind described, comprising a wheeled axle having straps mounted thereon terminating in eyes, a bolt connecting said eyes, a foot rest mounted upon said straps terminating in a dash, a spring-supported seat mounted upon said straps, straps carried by said seat extending under said foot rest having a pivotal connection with said bolt, a pivoted foot rest at the opposite end of said seat, and a sectional back having a pivotal connection with said seat and capable of being shifted to either end thereof.

7. A convertible carriage comprising a wheeled axle having straps mounted thereon, a bolt connecting said straps, a foot rest carried by said straps, a spring-supported seat mounted upon said straps, spaced straps connected to said seat having a pivotal connection with said bolt, a tongue carried by one of the first-mentioned straps, a support for said tongue, a support carried by said axle extending to the opposite side thereof, a foot rest pivotally connected to said seat at the opposite end thereof, side frames carried by said seat provided with central standards, links carried by said standards, pivoted levers carried by said standards, links connected to the upper end of said levers, a back carried by said links, and links connecting the lower ends of said levers to said pivotally mounted foot rest.

8. A convertible carriage, comprising a wheeled axle, a spring-supported seat carried by said axle, side frames mounted upon said seat provided with central standards, links pivotally connected to said standards, levers pivotally mounted upon said standards, a back having a pivotal connection with said links, links connecting said levers to said back, and supports carried by said side frame engaging said links for supporting said back in vertical position.

9. A convertible carriage of the kind described, comprising a wheeled axle having straps mounted thereon provided with upwardly curved ends terminating in eyes, a bolt extending through the eyes of said straps, a tongue carried by one of said straps, a foot rest fixed to said straps, a spring supported seat mounted upon said straps, straps carried by said seat extending under said foot rest having a pivotal connection with said bolt, and a pivotally mounted back formed of two sections pivotally connected together, said sections having means for locking the sections in folded or set-up position.

10. A convertible carriage of the kind described, comprising a wheeled axle having straps mounted thereon, connected together by a bolt, a bolster mounted upon said straps, coil springs mounted upon said bolster, a second bolster arranged upon said springs, a seat fixed on said second bolster, side frames fixed on said seat, a link-supported back capable of being shifted to either end of said seat, means for holding said back in vertical position, and foot rests arranged at the opposite ends of said seat.

11. A convertible carriage, comprising a wheeled axle having a bolster mounted thereon, coil springs arranged upon said bolster, a second bolster arranged upon said springs, a seat mounted upon said second bolster, frames mounted upon said seat, links pivotally mounted upon said frames, levers mounted upon said frames, links carried by said frames and levers, a back connected to said links and a fixed foot rest at one end of said frame and a pivoted foot rest at the opposite end thereof, said pivoted foot rest having a pivotal connection with said levers.

12. A convertible carriage, comprising a wheeled axle, a spring-supported seat mounted upon said axle, a fixed foot rest at one end of said seat, a pivoted foot rest at the opposite end of said seat, side frames carried by said seat, links pivotally mounted upon said side frames, levers mounted upon said frames, a back having a pivotal connection with said levers, and links pivotally connecting the pivoted foot rest to the lower ends of said levers.

13. A convertible carriage of the kind described, comprising a wheeled axle, straps mounted upon said axle having a foot rest mounted thereon, a tongue extending from said straps, a support for said tongue, a support carried by said axle and extending into the opposite direction thereto, a spring-supported seat mounted upon said straps, and a pivotally mounted sectional back carried by said seat having means for locking the sections in folded or set-up position.

14. A convertible carriage, comprising a wheeled axle having straps mounted thereon carrying a foot rest terminating in a dash, said straps being connected together by a bolt, a spring-supported seat mounted upon said straps, spaced straps connected to said seat extending under said foot rest and having a pivotal connection with said bolt, a tongue connected to the first-mentioned strap, a support for said tongue, a support carried by said axle extending outwardly therefrom, and a pivotally mounted sectional back having side rails carried by said seat, means for locking said rails together, and means for locking said sections in folded position.

15. A convertible carriage of the kind described, comprising a wheeled axle, a spring-supported seat, foot rests arranged at the ends of said seat, supports arranged to each side of said axle, side rails carried by said seat, a sectional back having a pivotal connection with said side rails, said sectional back having side rails, catches carried by the side rails of one section engaging the side rails of the adjacent section, and a keeper carried by one section engaged by a catch carried by the other section for locking said sections in folded position.

16. A convertible carriage, comprising a wheeled axle having a spring-supported seat mounted thereon, supports arranged at the opposite sides of said axle, foot rests arranged at the ends of said seat, one of said foot rests being fixed and the other pivoted, side rails carried by said seat, levers pivotally mounted upon said side rails, links connecting the lower ends of said levers with said pivotally mounted foot rest, links carried by the upper ends of said levers, links mounted upon said side rails, and a back having a pivotal connection with said links and capable of being shifted to either end of said seat.

In testimony whereof I affix my signature in presence of two witnesses.

HENRY A. WILLIAMS.

Witnesses:
JOHN E. JONES,
ANDREW DUNCAN.

---

Copies of this patent may be obtained for five cents each, by addressing the "Commissioner of Patents, Washington, D. C."